June 9, 1959 — E. T. LINDEROTH — 2,889,906
DUST DISCHARGE DEVICES
Filed July 7, 1954 — 2 Sheets-Sheet 1
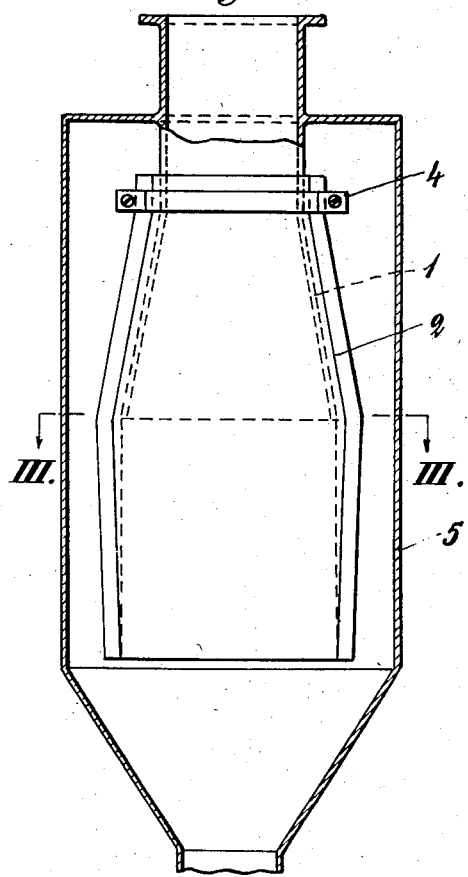
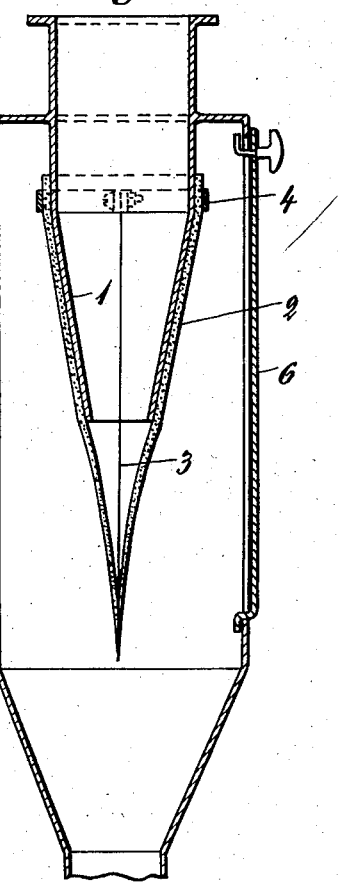
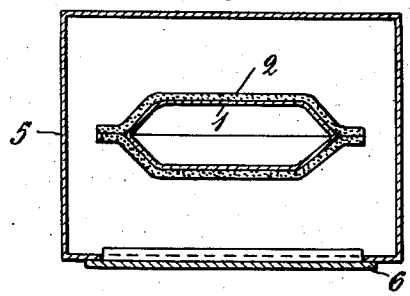
INVENTOR
ERIK TORVALD LINDEROTH
ATTORNEY June 9, 1959  E. T. LINDEROTH  2,889,906
DUST DISCHARGE DEVICES
Filed July 7, 1954  2 Sheets-Sheet 2

INVENTOR
ERIK TORVALD LINDEROTH
ATTORNEY

United States Patent Office 2,889,906
Patented June 9, 1959

2,889,906

DUST DISCHARGE DEVICES

Erik Torvald Linderoth, Stockholm, Sweden

Application July 7, 1954, Serial No. 441,781

Claims priority, application Sweden July 9, 1953

8 Claims. (Cl. 193—32)

The discharge of the dust deposited in dust separators of various types has always been a difficult problem. The space in which the dust is collected is usually maintained under a pressure below atmospheric, so that the dust must be discharged against a higher pressure while at the same time air must be prevented from leaking in the opposite direction. Even a slight leakage causes serious disturbances in the operation of the dust separator.

To permit such dust discharge it has been proposed to use e.g. rotary sluice devices, two intermittently operating slide valves connected in series or the like.

In such devices, however, it has been difficult to obtain a satisfactory gas-tightness, since sluice devices must operate with a certain clearance and slide valves must move in guide members, which may become choked with dust and prevent effective closure. Furthermore, such devices must be provided with some sort of driving means which impair the operational reliability. To this may be added that all such mechanical discharging devices are disproportionately expensive in manufacture.

The object of this invention is to provide means to convey by gravity a dust material from a higher to a lower level against a rising pressure. In accordance with this invention, this is achieved by means of a downwardly extending conduit from the higher to the lower level, said conduit terminating at its lower end in a tube of soft, flexible or pliable material, such as natural or synthetic rubber or a plastic material, such as "Teflon" (polytetrafluoroethylene), preferably having a wall thickness decreasing downwards toward its outlet end, whereby the tube as a result of the pressure difference between the higher and the lower levels will be collapsed and shaped in conformity with the moving dust column so as to prevent gas flow from the lower to the higher level.

The invention will be described in more detail below with reference to the embodiment shown by way of example on the attached drawing.

Figures 1 and 2 show, partly in section, two cross-sections taken at right angles to each other of a dust discharge device in accordance with this invention positioned in a dust collecting casing.

Figure 3 is a section taken along line III—III in Figure 1.

Figure 4:
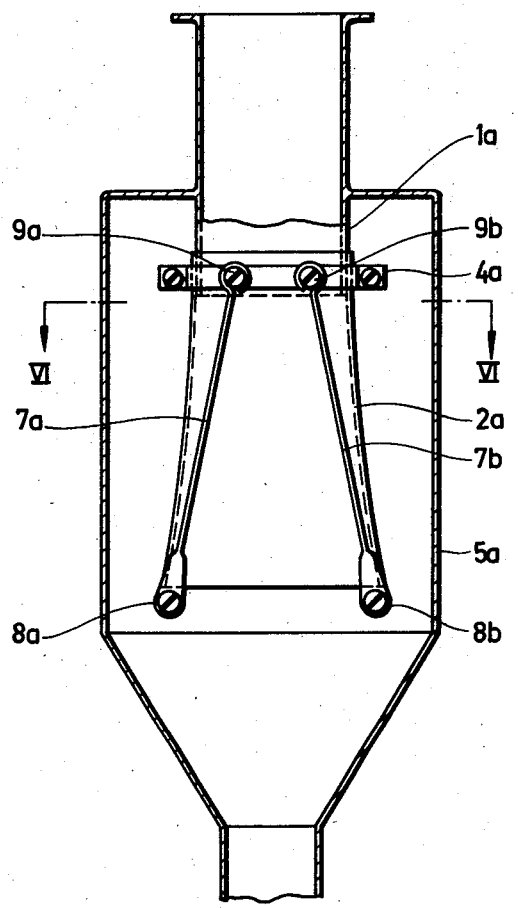
Figure 5:
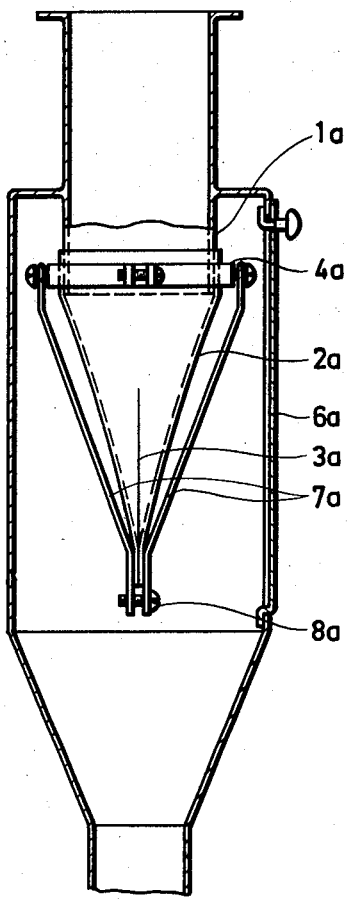
Figure 6:
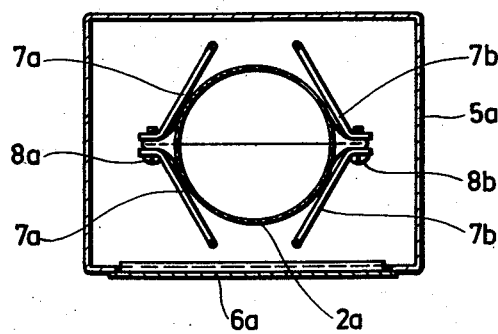

Figures 4, 5, and 6 are views corresponding to Figures 1, 2 and 3 respectively and illustrate a modified form of the invention.

Referring to the drawing, the numeral 1 designates a discharge nozzle adapted to be connected e.g. to the dust discharge outlet of a dust separator. In the example illustrated on the drawing, the top portion of the nozzle 1 is formed with a circular cross-section, while the lower portion thereof is somewhat flattened and also somewhat enlarged in one direction as seen from Figure 1. On the nozzle 1 there is fitted a tube 2 of soft, flexible or pliable material, such as natural or synthetic rubber, or a plastic material, such as "Teflon" (polytetrafluoroethylene), which at two opposed sides has a fold 3, which facilitates complete collapse of the tube in the manner shown in Figure 2. The tube which is attached to the nozzle by means of a clamping band 4 is suitably prepared from a number of flatsheets each one of which is joined along its longitudinal edges to the corresponding edges of the adjacent sheet, such as by welding or vulcanisation.

The discharge device is surrounded by a casing 5 in which the discharged dust is collected for further conveyance and/or treatment. The casing has an inspection door 6.

Instead of forming the flexible tube with decreasing thickness it is possible to make it from a thin material throughout and provide stiffening of stretching means which prevent the tube from being sucked up into the nozzle by the lower pressure which prevails therein. This is particularly preferable if the tube is made from an expensive material, e.g. "Teflon."

An example of such an embodiment is shown in Figures 4 to 6, in which the reference characters 1a to 6a denote the same parts as numerals 1 to 6 in Figures 1 to 3 except that the tube 2a is thin-walled throughout and the nozzle 1a is not flattened since this is not necessary when stiffening or stretching means are provided which maintain the desired shape of the tube. A suitable stretching device comprises two links 7a and 7b each including two parts between which the lower end of the tube is clamped at two opposed points by means of screws 8a, 8b so that the folds above referred to are formed. Thus, in this case the folds need not be pre-formed in the tube, but this may be formed simply as a thin-walled cylinder. At their top ends the links 7a, 7b are pivotally secured to the clamping ring 4a, the points of securement 9a, 9b being so positioned that the tube is stretched not only longitudinally, but also, though to a lesser degree transversely.

It is also within the scope of the invention to unite the links 7a, 7b adhesively or otherwise to the outside of the tube, in which case the clamping means 8a, 8b as well as the securing means 9a, 9b are dispensed with. In that case, the links will serve to stiffen the tube in a manner similar to the action of the corset springs in a corset.

Since, however, the tube is a part which will have to be exchanged regularly on account of aging or wear, the stretching means shown on the drawing is to be preferred, as the part which must be exchanged is most simple and less expensive in that arrangement.

While certain representative embodiments and details have been shown and described in order to explain the invention it will be obvious to those skilled in the art that these are capable of various modifications and changes within the skill of the art.

Having now particularly described the nature of my invention and the manner of its operation what I claim is:

1. In a discharge device for discharging by gravity dust from a dust separator against an ambient gaseous surpressure, said device comprising a substantially perpendicularly disposed discharge chute for discharging therethrough dust by gravity, the interior of said chute being maintained at a lower operational pressure than the ambient pressure, and valve means at the lower end of said duct to prevent the ingress of ambient gaseous medium into the chute but to permit discharge of dust, said valve means including a flexible duct having a lower part of generally rectangular peripheral outline and conical cross section and depending downwardly from said chute, said duct being defined by a flexible wall continuously decreasing in thickness toward said lower end and being collapsible by the pressure differential to close the duct and expandable by the weight of dust descending through the duct to adapt the cross-sectional area of the duct to the cross-sectional area of the dust column descending therein, at least the lower part of said duct being formed with peripherally spaced longitudinal fold lines to facilitate closing of the lower duct part by said differential pressure, thereby effecting a sealing closure in the outlet end of the duct to prevent ingress of ambient gaseous medium.

2. In a discharge device for discharging by gravity dust through the discharge chute of a dust separator against an ambient gaseous pressure higher than the pressure within the duct, a valve means for preventing the ingress of ambient gaseous medium into the discharge chute but permitting discharge of dust therethrough, said valve means comprising a substantially perpendicularly disposed pliable flexible duct having a lower part of substantially rectangular peripheral outline and conical cross section, said duct being defined by a flexible wall continuously decreasing in thickness toward said lower end and being collapsible by the pressure differential to close the duct and expandable by the weight of dust descending therethrough to adapt the cross-sectional area of the duct to the cross-sectional area of the dust column descending therethrough, at least the lower part of said duct being formed with peripherally spaced longitudinal fold lines to facilitate closing of said lower duct part by said differential pressure thereby effecting a sealing closure at the outlet end of the duct to prevent ingress of ambient gaseous medium.

3. A discharge device according to claim 2, wherein the lower part of said duct is biased toward its collapsed shape to effect a sealing closure at said part by the differential pressure.

4. A discharge device according to claim 1, wherein two diametrically opposite fold lines are provided, the duct part having said fold lines being biased toward a flattened configuration.

5. A discharge device according to claim 2, wherein said duct is formed of several pliable elastic strips each having longitudinal edges, each longitudinal edge of each sheet being joined to one longitudinal edge of an adjacent sheet, said joint edges constituting fold lines of the duct.

6. A discharge device according to claim 2, wherein the upper part of said duct has a substantially circular cross-section faired into the generally rectangular cross-section of the lower part.

7. A discharge device according to claim 2, wherein stiffening means extend longitudinally along said duct to prevent folding of the same in other than longitudinal direction by said differential pressure.

8. A discharge device according to claim 7, wherein said stiffening means comprise substantially rigid bars extending along the outside wall of the duct and secured thereto to form fold lines in the duct.

References Cited in the file of this patent
UNITED STATES PATENTS

| | | |
|---|---|---|
| 1,265,908 | Hart | May 14, 1918 |
| 2,647,728 | Smith | Aug. 4, 1953 |
| 2,662,724 | Kravagna | Dec. 15, 1953 |